United States Patent [19]

Yoshida et al.

[11] Patent Number: 4,637,653
[45] Date of Patent: Jan. 20, 1987

[54] REAR SEAT CUSHION IN MOTOR VEHICLE

[75] Inventors: Takeshi Yoshida, Nagoya; Takayasu Honda, Toyota; Shunosuke Kitazume, Takarazuka; Kouzou Tanaka, Toyonaka, all of Japan

[73] Assignees: Toyota Jidosha Kabushiki Kaisha; Daihatsu Motor Co., Ltd., both of Japan

[21] Appl. No.: 813,966

[22] Filed: Dec. 27, 1985

[30] Foreign Application Priority Data

Dec. 28, 1984 [JP] Japan ............................ 59-198872[U]

[51] Int. Cl.⁴ .............................................. B60N 1/10
[52] U.S. Cl. .................................. 297/334; 296/65 R
[58] Field of Search .............. 297/331, 334; 296/65 R

[56] References Cited

U.S. PATENT DOCUMENTS

| | | | |
|---|---|---|---|
| 3,873,153 | 3/1975 | MacKintosh | 297/334 |
| 4,390,205 | 6/1983 | Louis | 297/334 X |
| 4,512,609 | 4/1985 | Parsson | 297/331 |

Primary Examiner—Kenneth Downey
Attorney, Agent, or Firm—Finnegan, Henderson, Farabow, Garrett & Dunner

[57] ABSTRACT

A rear seat cushion in a motor vehicle, which is mounted to rotate forwardly into an erect position to expand the loading space in the rear portion of the vehicle compartment. A quadric rotary link mechanism is used to connect a seat cushion to a vehicle floor and includes a seat cushion side link provided on the seat cushion substantially horizontally in the longitudinal direction of the vehicle, a floor side link provided on the vehicle floor positioned downwardly of the forward end of the seat cushion substantially vertically in the longitudinal direction of the vehicle, a lower link pin-connected at opposite ends thereof to the forward end portion of the seat cushion side link and the bottom end portion of the floor side link, and an upper link pin-connected at opposite ends thereof to the rear end portion of the seat cushion side link and the top end portion of the floor side link.

24 Claims, 5 Drawing Figures

REAR SEAT CUSHION IN MOTOR VEHICLE

BACKGROUND OF THE INVENTION

1. Field of the Invention

This invention relates to a rear seat cushion in a motor vehicle, and more particularly to improvements in a rear seat cushion in a motor vehicle, of the type, for example, that has a back door and a rear seat cushion designed to be moved forward to an erect position and a backrest designed also to be moved foward, so that the loading or cargo space in the rear portion of the vehicle is expanded.

2. Description of the Prior Art

Among the so-called box-type vehicles such as a light van, station wagon and the like, having a back door, it has been customary to pivot the backrest of a rear seat to forwardly to expand thereby the loading space at the rear of the vehicle. However, in some cases where the backrest is merely pivoted forward onto the top surface of a fixed seat cushion, the rear surface of the backrest is inclined to a considerable extent to the deck or a large difference in height is created between the rear surface of the backrest and the surface of a deck, thereby to lessen the usefulness of the loading space.

In contrast to the above, there is shown in FIG. 5, for example, a seat cushion 1 which is adapted to be pivoted by rotating about a hinge 2 at the lower forward portion of the seat cushion. A backrest 3 is moved forwardly down into the space vacated by the pivoting of the seat cushion 1. This construction is shown in Japanese Utility Model Application No. 149804/1981 by the present applicant.

The above-described conventional rear seat cushion has a pivoting or pull-up mechanism which utilizes a hinge 2 to permit the rear seat cushion 1 to move or pivot in a circular motion centered about the hinge 2 relative to the original position, thus presenting the disadvantage of having smaller loading space dimensions than would be the case were the rear seat cushion pivoted further forward.

As against the above, when the rear seat cushion 1 is designed to be provided as far forwardly as possible in order to make the loading space dimensions larger, it requires that the leg space formed forwardly or the rear seat cushion 1 be narrowed, thus sacrificing the comfort of passengers sitting on the rear seat cushion 1.

Furtheremore, when the hinge 2 is made large and the locus of circular motion centered about the hinge 2 is made large in order to expand the loading space dimensions, the operating force needed to pull up the rear seat cushion 1 in increased, thereby presenting a disadvantage in handling. This increase in force is needed because the distance from the center of the hinge 2 to the center of gravity of the rear seat cushion 1 has been increased.

SUMMARY OF THE INVENTION

It is therefore the primary object of the present invention to provide a rear seat cushion in a motor vehicle, wherein the loading space dimensions, when the rear seat cushion is pulled up forwardly to an erect position, are maximized to the extent possible, while passenger comfort in the rear seat is maintained, and the operating force needed for pulling-up is decreased so that the pivoting of the seat to an erect position is easily performed.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the rear seat cushion of this invention comprises a quadric rotary link mechanism comprising a seat cushion side link connected to said seat cushion substantially horizontally with reference to the logitudinal direction of the vehicle, a floor side link connected to the vehicle floor downwardly from the forward end of said seat cushion and substantially vertically with reference to the longitudinal direction of the vehicle, a lower link pin-connected at opposite top and bottom ends thereof to the forward end portion of said seat cushion side link and the bottom end portion of said floor side link, respectively, and an upper link pin-connected at opposite rear and forward ends thereof to the rear end portion of said seat cushion side link and the top end portion of said floor side link, respectively, and said seat cushion being secured to the floor through said quadric rotary link mechanism.

The present invention further contemplates that the lower link and upper link are each constructed in a U-shaped cross section and include a plate member having opposite end portions bent along imaginary lines in the longitudinal direction of the vehicle to thereby provide side plates for connecting said lower and upper links, said side plates having opposed holes formed therethrough at opposite ends thereof; said seat cushion side link and floor side link are each constructed with a plate member smaller in width than the inner width between said side plates of said lower and upper links, and each plate member is bent at opposite end portions to provide end portions substantially in the shape of a cylinder; and said quadric rotary link mechanism further comprises mounting pins inserted through said holes and said cylindrical end portions of said seat cushion side link and said floor side link to rotatably connect said four links.

The present invention additionally contemplates that a pair of quadric rotary link mechanisms are provided at positions adjacent to opposite side ends of the seat cushion considered with respect to vehicle width.

The present invention contemplates that the seat cushion side link is composed of first spaced apart mounting brackets, one of said first mounting brackets being pin-connected to said top end of said lower link, and another of said first mounting brackets being pin connected to said rear end of said upper link; and said floor side link is composed of second spaced-apart mounting brackets, one of said second mounting brackets being pin-connected to said bottom end of said lower link, and another of said second mounting brackets being pin connected to said forward end of said upper link.

The present invention further contemplates that the upper link is positioned at the central portion of said seat cushion considered with respect to vehicle width; and said quadric rotary link mechanism further comprises a second lower link, said lower links being positioned adjacent to the opposite side ends of said seat cushion considered with respect to vehicle width, the third of said first mounting brackets of said seat cushion side link being pin-connected to the top end of said second lower link; and the third of said second mounting brackets of said floor side link being pin connected to the bottom end of said second lower link.

The present invention further contemplates that the floor side link is connected to a stepped portion of the vehicle floor.

The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENT

Description will be given of embodiments of the present invention with reference to the drawings.

Figure 1:
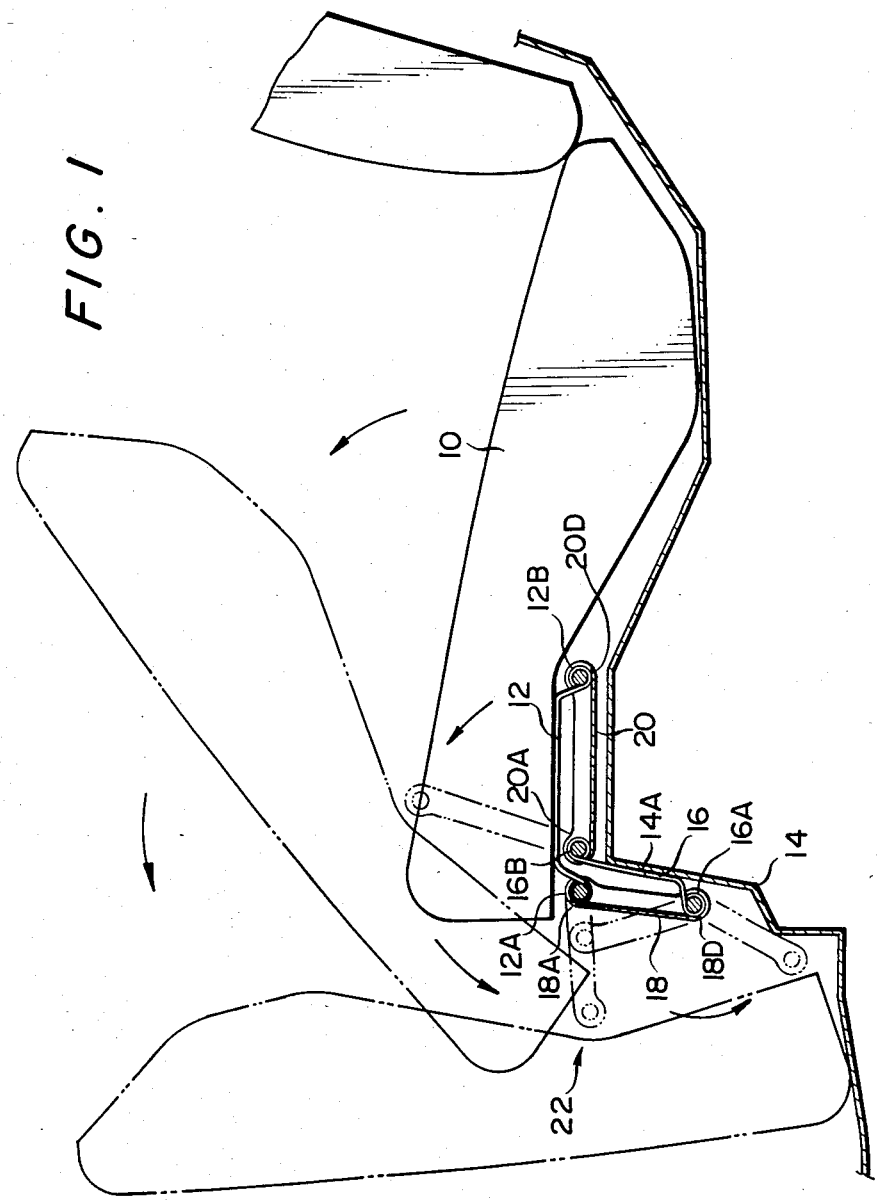
FIG. 1 is a side view showing a first embodiment of the rear seat cushion in a motor vehicle constructed according to the present invention.
Figure 2:
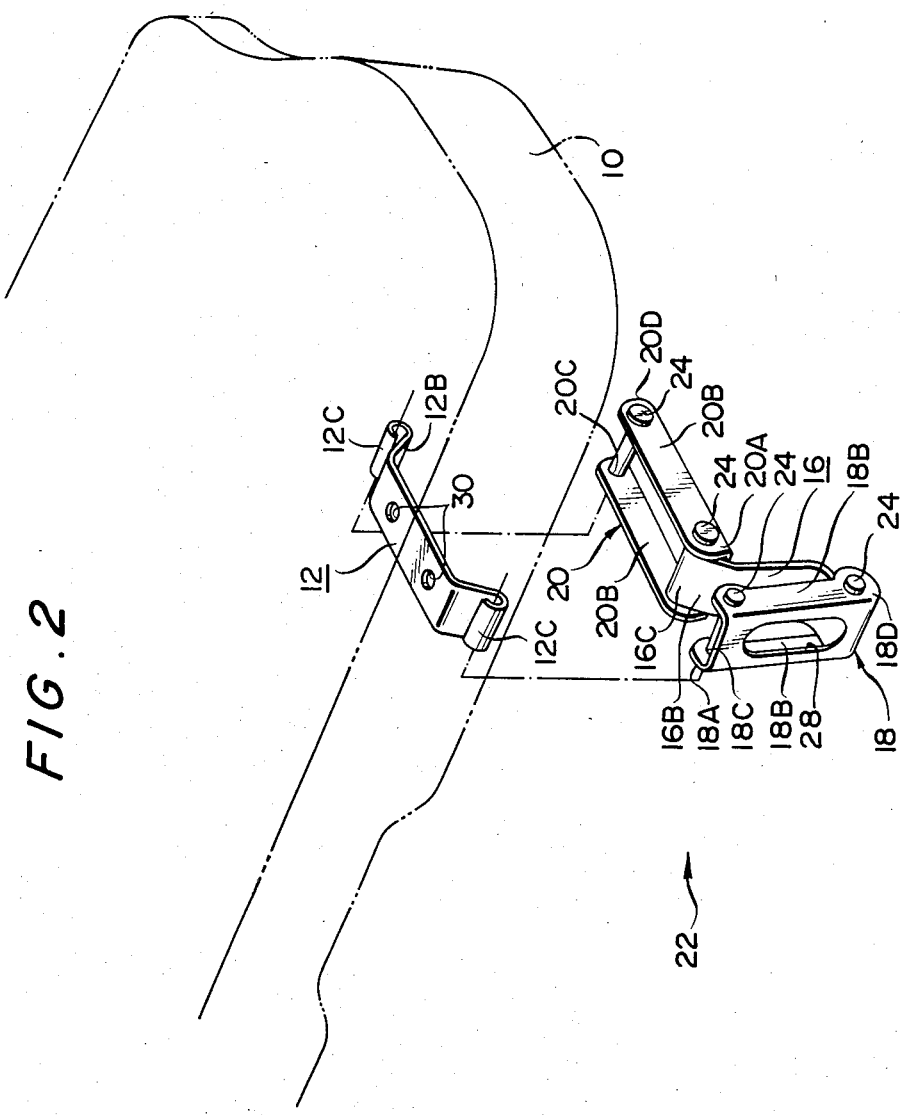
FIG. 2 is a perspective view showing construction of essential portions of the link mechanism of the embodiment of FIG. 1.

In FIGS. 1 and 2, according to the first embodiment, there is shown the construction of a rear seat cushion in a motor vehicle, wherein a seat cushion 10 is rotated or pivoted forwardly to a substantially erect or vertical position to expand the loading or cargo space in the rear portion of the vehicle compartment. A quadric rotary link mechanism 22 is shown which comprises a seat cushion side link 12 provided on a seat cushion 10 substantially horizontally in the longitudinal direction of the vehicle. A floor side link 16 is provided on a floor 14 positioned downwardly of the forward end of the seat cushion 10 substantially vertically in the longitudinal direction of the vehicle. A lower link 18 is pin-connected at top and bottom ends 18A and 18D thereof respectively to the forward end portion 12A of the seat cushion side link 12 and the bottom end portion 16A of the floor side link 16, and an upper link 20 is pin-connected at forward and rear ends 20A and 20D thereof respectively to the rear end portion 12B of the seat cushion side link 12 and the top end portion 16B of the floor side link 16. The seat cushion 10 is secured to the vehicle floor 14 through this quadric rotary link mechanism 22.

The lower link 18 and the upper link 20 of quadric rotary link mechanism 22 are each constructed in a U-shaped cross section such that opposite end portions of the plate members forming these links in a widthwise direction of the vehicle are bent along imaginary bending lines in the longitudinal direction of the vehicle to thereby provide side plates 18B and 20B, respectively, for suspending these two links. The seat cushion side link 12 and the floor side link 16 are each constructed to include a plate member smaller in width than the inner width of the side plates 18B and 20B of the lower and upper links 18 and 20. Each plate member is bent at opposite end portions, 12A, 12B and 16A, 16B, respectively, in the longitudinal direction of the vehicle to provide end portions 12C and 16C substantially in the shape of a cylinder. Mounting pins 24 are inserted through opposed holes 18C and 20C formed in the opposite side plates 18B and 20B at the ends 18A, 18D and 20A, 20D of the lower and upper links 18 and 20, respectively, and through the corresponding cylindrical end portions 12C and 16C of the seat cushion side link 12 and the floor side link 16, as shown in FIGS. 1 and 2, to rotatably and circularly connect said four links.

Quadric rotary link mechanisms 22 are provided at positions adjacent to opposite side ends of the seat cushion 10 in the widthwise direction of the vehicle. Further, the floor side link 16 is secured to the forward end surface of a stepped portion 14A of the floor 14, downwardly of the forward end of the seat cushion 10. Additionally, designated at numeral 28 in the drawing are holes formed in the main surfaces in the lower link 18 and the upper link 20 (not shown) to lighten the weight of these links. Mounting holes 30, through which are inserted mounting screws, are formed in the main surfaces of the seat cushion side link 12 and the floor side link 16 (not shown).

In consequence, in the first embodiment, when the seat cushion 10 is pulled up forwardly to an erect position, the seat cushion 10 is upwardly rotated about the top end portion 16B of the floor side link 16 in the initial stage of pull-up. The top end 16B of the floor side link acts as the center of rotation and the distance between the center of gravity of the seat cushion 10 and this center of rotation is reduced as compared to the prior art, so that the moment or torque serving as the necessary operating force is reduced, thus enabling a person to easily pull up the seat cushion 10. Moreover, when the center of gravity of the seat cushion 10 is moved to a position forward of the center of rotation during the pull-up operation, the lower link 18 also begins to rotate in a pronounced manner about a hinge formed with the floor side link 16 and the gravity of the seat cushion 10 acts to permit it to easily erect itself in response to this rotation, reducing the force needed to move the seat cushion.

Furthermore, in the forward erection of the rear seat cushion, the seat cushion 10 is caused to turn through a large turning radius by means of the lower link 18 and the upper link 20 of the quadric rotary link mechanism 22, so that a larger loading space in the rear portion of the compartment is created once the rear seat cushion 10 is erected, which differs from the conventional case where the rear seat cushion is merely rotated by use of a hinge.

Particularly, in the first embodiment, the lower link 18 and the upper link 20 are provided with the side plates 18B and 20B, respectively, so that the links themselves are improved in rigidity. In consequence, the quadric rotary link mechanism 22 constituted by these links has improved anti-torsion properties.

The seat cushion side link 12 and the floor side link 16 are constructed such that the cylindrical end portions 12C and 16C are formed at the opposite end portions of the plate members, respectively, so that the construction arrangement can be simplified. Due to the shapes of the lower link 18 and the upper link 20, and the above described shapes of the seat cushion side link 12 and the floor side link 16, the thickness of the quadric rotary link mechanisms 22 in the seated state of the seat cushion 10 can be substantially flat, whereby the mounting can be easily performed. Moreover, in the seated state of the seat cushion 10, the quadric rotary link mechanisms 22 is brought into the collapsed position, whereby the quadric rotary link mechanisms 22 does not protrude forwardly from the seat cushion 10, and the feeling of comfort experienced by the passenger when using the seat cushion 10 in the seated state is not impaired.

Figure 3:
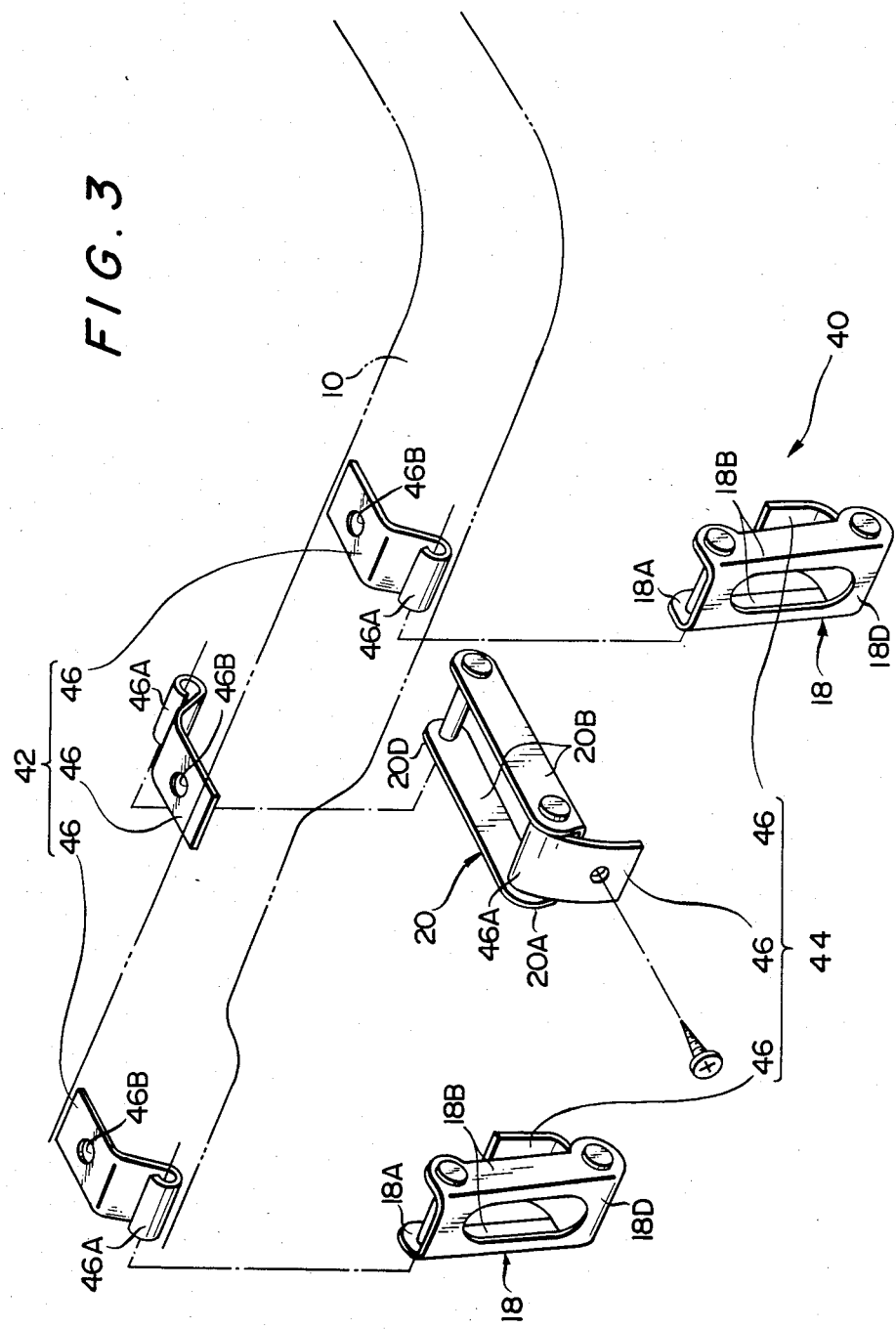
FIG. 3 is a perspective view showing the construction of essential portions of a second embodiment of the present invention.

As shown in FIG. 3, in the second embodiment, a seat cushion side link 42 of a quadric rotary link mechanism 40 is constructed such that mounting brackets 46, to which the top ends 18A of the lower links 18 and the rear end portion 20D of the upper link 20 are pin-connected, are provided on the seat cushion 10. A floor side link 44 in constructed such that mounting brackets 46, to which the bottom ends 18D of the lower links 18 and the forward end 20A of the upper link 20 are pin-connected, are provided on the floor 14. The upper link 20 is provided at the central portion of the seat cushion 10 in the widthwise direction of the vehicle, and the lower links 18 are provided at positions adjacent to the opposite side ends of the seat cushion 10 in the widthwise direction of the vehicle.

The mounting bracket 46 are smaller in width than the inner width between the side plates 18B and 20B of the lower link 18 and the upper link 20, respectively, and end portions thereof are each bent into a cylindrical shape to provide a cylindrical end portion 46A. Additionally, designated at 46B in the drawing is a mounting hole for mounting each of the mounting brackets 46 to the seat cushion 10 or the floor 14.

In consequence, in the second embodiment, the seat cushion side link 42 is formed by the mounting brackets 46 mounted onto the seat cushion 10, and the floor side link 44 is formed by the mounting brackets 46 mounted onto the floor 14, whereby the seat cushion side link 42, the floor side link 44, one upper link 20 and two lower links 18 constitute the quadric rotary link mechanism 40. The erecting operation of the rear seat cushion 10 is smoothly performed, and with a simplified construction as compared with the first embodiment, in which a pair of quadric rotary link mechanisms are provided.

Figure 4:
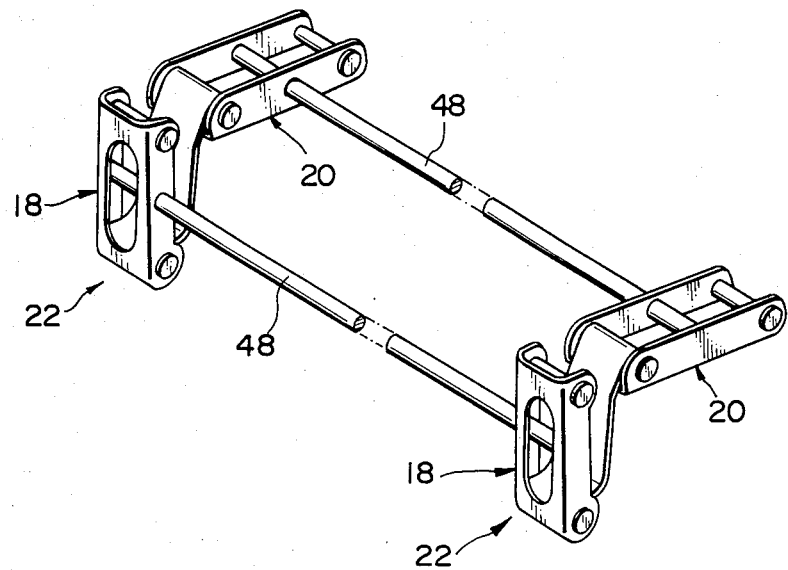
FIG. 4 is a perspective view showing the construction of essential portions of a third embodiment of the present invention.
Figure 5:
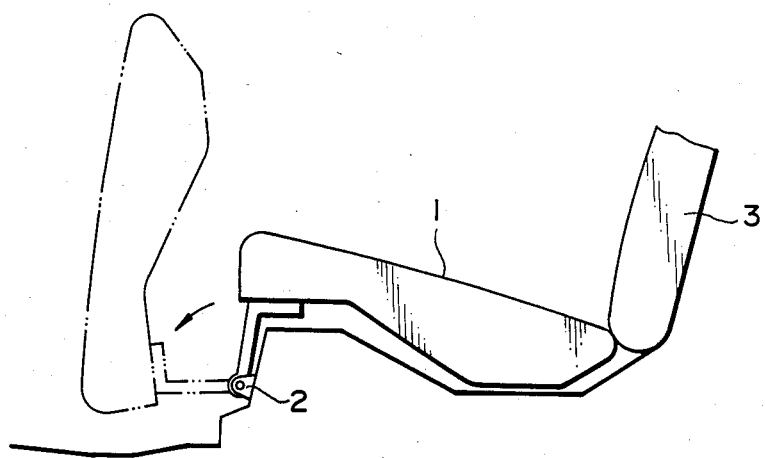
FIG. 5 is a side view showing a conventional rear seat cushion in a motor vehicle.

As shown in FIG. 4, in the third embodiment, when a pair of the quadric rotary link mechanisms 22 are provided at the positions adjacent to the opposite end portions of the seat cushion 10 as described in FIG. 1, connecting members 48 can be provided between the upper links 20 and between the lower links 18, respectively, so that both quadric rotary link mechanisms 22 are interlocked with each other and move together. In this third embodiment, the rocking angles of the links 18 and 20, opposed to each other are constantly equal to each other, whereby the seat cushion 10 can move in parallel with the longitudinal direction of the vehicle with the seat cushion 10 not being distorted, so that the erecting operation of the seat cushion 10 can be easily performed. Moreover, since both quadric rotary link mechanisms 22 are interlocked with each other, neither of the quadric rotary link mechanisms 22 can operate first but instead must move together, so that the quadric rotary link mechanisms are not distorted, thus improving the durability of the quadric rotary link mechanisms.

Additionally, in the first embodiment of FIGS. 1 and 2, the pair of quadric rotary link mechanisms 22 have been positioned at the positions close to the right and left side end portions of the seat cushion 10; however, the present invention need not necessarily be limited to this, and the number of the quadric rotary link mechanisms provided may be adequately increased or decreased in accordance with the size of the rear seat cushion. More specifically, when the rear seat cushion 10 is small in width, a quadric rotary link mechanism can be provided only at the central portion of the seat cushion, and, when the seat cushion 10 is large in width, a quadric rotary link mechanism may be provided at the central portion of the seat cushion in addition to the quadric rotary link mechanisms provided at the right and left side end portions.

Further, the quadric rotary link mechanism 40 in the second embodiment (FIG. 3) is constructed such that the seat cushion side link 42 and the floor side link 44 each comprise three mounting brackets 46. Each mounting bracket is plate-shaped and has one turning center and is formed integrally with the seat cushion 10 or the floor 14, as the case may be. However, the number of the turning centers need not necessarily be limited to that depicted in FIG. 3, and may be increased or decreased in accordance with the size of the seat cushion 10. More specifically, the number of lower links 18 and upper links 20 for connecting the seat cushion side links 42 and the floor side links 44 may be increased or decreased in accordance with the size of the seat cushion 10.

What is claimed is:

1. A rear seat cushion for a motor vehicle, wherein the seat cushion is designed to be rotated forwardly to an erect position to expand the loading space in the rear portion of the vehicle compartment, having
    a quadric rotary link mechanism comprises a seat cushion side link connected to said seat cushion substantially horizontally with reference to the longitudinal direction of the vehicle, a floor side link connected to the vehicle floor downwardly from the forward end of said seat cushion and substantially vertically with reference to the longitudinal direction of the vehicle, a lower link pin-connected at opposite top and bottom ends thereof to the forward end portion of said seat cushion side link and the bottom end portion of said floor side link, respectively, and an upper link pin-connected at opposite rear and forward ends thereof to the rear end portion of said seat cushion side link and the top end portion of said floor side link, respectively, and
    said seat cushion being secured to the floor through said quadric rotary link mechanism.

2. A rear seat cushion in a motor vehicle as set forth in claim 1, wherein:
    said lower link and upper link are each constructed in a U-shaped cross section and include a plate member having opposite end portions bent along imaginary lines in the longitudinal direction of the vehicle to thereby provide side plates for connecting said lower and upper links, said side plates having opposed holes formed therethrough at opposite ends thereof;
    said seat cushion side link and floor side link are each constructed with a plate member smaller in width than the inner width between said side plates of said lower and upper links, and each plate member is bent at opposite end portions to provide end portions substantially in the shape of a cylinder; and
    said quadric rotary link mechanism further comprises mounting pins inserted through said holes and said cylindrical end portions of said seat cushion side link and said floor side link to rotatably connect said four links.

3. A rear seat cushion in a motor vehicle as set forth in claim 1, wherein a pair of quadric rotary link mechanisms are provided adjacent to opposite side ends of the seat cushion considered with respect to vehicle width.

4. A rear seat cushion in a motor vehicle as set forth in claim 2, wherein a pair of quadric rotary link mechanisms are provided adjacent to opposite side ends of the seat cushion considered with respect to vehicle width.

5. A rear seat cushion in a motor vehicle as set forth in claim 1, wherein:
said seat cushion side link is composed of first spaced apart mounting brackets, one of said first mounting brackets being pin-connected to said top end of said lower link, and another of said first mounting brackets being pin-connected to said rear end of said upper link; and
said floor side link is composed of second spaced-apart mounting brackets, one of said second mounting brackets being pin-connected to said bottom end of said lower link, and another of said second mounting brackets being pin-connected to said forward end of said upper link.

6. A rear seat cushion in a motor vehicle as set forth in claim 2, wherein:
said seat cushion side link is composed of first spaced apart mounting brackets, one of said first mounting brackets being pin-connected to said top end of said lower link, and another of said first mounting brackets being pin-connected to said rear end of said upper link; and
said floor side link is composed of second spaced-apart mounting brackets, one of said second mounting brackets being pin-connected to said bottom end of said lower link, and another of said second mounting brackets being pin-connected to said forward end of said upper link.

7. A rear seat cushion in a motor vehicle as set forth in claim 3, wherein:
said seat cushion side link is composed of first spaced apart mounting brackets, one of said first mounting brackets being pin-connected to said top end of said lower link, and another of said first mounting brackets being pin-connected to said rear end of said upper link; and
said floor side link is composed of second spaced-apart mounting brackets, one of said second mounting brackets being pin-connected to said bottom end of said lower link, and another of said second mounting brackets being pin-connected to said forward end of said upper link.

8. A rear seat cushion in a motor vehicle as set forth in claim 4, wherein:
said seat cushion side link is composed of first spaced apart mounting brackets, one of said first mounting brackets being pin-connected to said top end of said lower link, and another of said first mounting brackets being pin-connected to said rear end of said upper link; and
said floor side link is composed of second spaced-apart mounting brackets, one of said second mounting brackets being pin-connected to said bottom end of said lower link, and another of said second mounting brackets being pin-connected to said forward end of said upper link.

9. A rear seat cushion in a motor vehicle as set forth in claim 5, wherein said upper link is positioned at the central portion of said seat cushion considered with respect to vehicle width;
said quadric rotary link mechanism further comprises a second lower link, said lower links being positioned adjacent to the opposite side ends of said seat cushion considered with respect to vehicle width;
the third of said first mounting brackets of said seat cushion side link being pin-connected to the top end of said second lower link; and
the third of said second mounting brackets of said floor side link being pin-connected to the bottom end of said second lower link.

10. A rear seat cushion in a motor vehicle as set forth in claim 6, wherein said upper link is positioned at the central portion of said seat cushion considered with respect to vehicle width;
said quadric rotary link mechanism further comprises a second lower link, said lower links being positioned adjacent to the opposite side ends of said seat cushion considered with respect to vehicle width;
the third of said first mounting brackets of said seat cushion side link being pin-connected to the top end of said second lower link; and
the third of said second mounting brackets of said floor side link being pin-connected to the bottom end of said second lower link.

11. A rear seat cushion in a motor vehicle as set forth in claim 7, wherein said upper link is positioned at the central portion of said seat cushion considered with respect to vehicle width;
said quadric rotary link mechanism further comprises a second lower link, said lower links being positioned adjacent to the opposite side ends of said seat cushion considered with respect to vehicle width;
the third of said first mounting brackets of said seat cushion side link being pin-connected to the top end of said second lower link; and
the third of said second mounting brackets of said floor side link being pin-connected to the bottom end of said second lower link.

12. A rear seat cushion in a motor vehicle as set forth in claim 8, wherein said upper link is positioned at the central portion of said seat cushion considered with respect to vehicle width;
said quadric rotary link mechanism further comprises a second lower link, said lower links being positioned adjacent to the opposite side ends of said seat cushion considered with respect to vehicle width;
the third of said first mounting brackets of said seat cushion side link being pin-connected to the top end of said second lower link; and
the third of said second mounting brackets of said floor side link being pin-connected to the bottom end of said second lower link.

13. A rear seat cushion in a motor vehicle as set forth in claim 1, wherein said floor side link is connected to a stepped portion of said vehicle floor.

14. A rear seat cushion in a motor vehicle as set forth in claim 2, wherein said floor side link is connected to a stepped portion of said vehicle floor.

15. A rear seat cushion in a motor vehicle as set forth in claim 3, wherein said floor side link is connected to a stepped portion of said vehicle floor.

16. A rear seat cushion in a motor vehicle as set forth in claim 4, wherein said floor side link is connected to a stepped portion of said vehicle floor.

17. A rear seat cushion in a motor vehicle as set forth in claim 5, wherein said floor side link is connected to a stepped portion of said vehicle floor.

18. A rear seat cushion in a motor vehicle as set forth in claim 6, wherein said floor side link is connected to a stepped portion of said vehicle floor.

19. A rear seat cushion in a motor vehicle as set forth in claim 7, wherein said floor side link is connected to a stepped portion of said vehicle floor.

20. A rear seat cushion in a motor vehicle as set forth in claim 8, wherein said floor side link is connected to a stepped portion of said vehicle floor.

21. A rear seat cushion in a motor vehicle as set forth in claim 9, wherein said floor side link is connected to a stepped portion of said vehicle floor.

22. A rear seat cushion in a motor vehicle as set forth in claim 10, wherein said floor side link is connected to a stepped portion of said vehicle floor.

23. A rear seat cushion in a motor vehicle as set forth in claim 11, wherein said floor side link is connected to a stepped portion of said vehicle floor.

24. A rear seat cushion in a motor vehicle as set forth in claim 12, wherein said floor side link is connected to a stepped portion of said vehicle floor.

* * * * *